US011871383B2

(12) United States Patent
Gao et al.

(10) Patent No.: US 11,871,383 B2
(45) Date of Patent: Jan. 9, 2024

(54) TIMING-AWARE SCHEDULING

(71) Applicant: QUALCOMM Incorporated, San Diego, CA (US)

(72) Inventors: Kang Gao, San Diego, CA (US); Jun Zhu, San Diego, CA (US); Yong Li, San Diego, CA (US); Nagaraju Gajula, San Diego, CA (US); Jyothi Kiran Vattikonda, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/304,915

(22) Filed: Jun. 28, 2021

(65) Prior Publication Data

US 2022/0417915 A1 Dec. 29, 2022

(51) Int. Cl.
*H04W 72/044* (2023.01)
*H04W 56/00* (2009.01)
*H04W 8/22* (2009.01)
*H04W 72/30* (2023.01)
*H04W 72/542* (2023.01)

(52) U.S. Cl.
CPC ........... *H04W 72/044* (2013.01); *H04W 8/22* (2013.01); *H04W 56/001* (2013.01); *H04W 72/30* (2023.01); *H04W 72/542* (2023.01)

(58) Field of Classification Search
CPC ............ H04W 72/044; H04W 72/005; H04W 72/1231; H04W 56/001; H04W 8/22; H04W 72/30; H04W 72/542; H04W 48/16
See application file for complete search history.

(56) References Cited

U.S. PATENT DOCUMENTS

| | | | |
|---|---|---|---|
| 2016/0277225 A1* | 9/2016 | Frenne | H04L 5/0048 |
| 2017/0311353 A1* | 10/2017 | Liu | H04B 7/063 |
| 2018/0091212 A1* | 3/2018 | Lee | H04L 5/0048 |
| 2019/0059106 A1* | 2/2019 | Zhang | H04W 16/14 |
| 2019/0149383 A1* | 5/2019 | Ko | H04L 5/0053 370/329 |
| 2019/0223199 A1* | 7/2019 | Park | H04W 72/1289 |
| 2021/0235456 A1* | 7/2021 | Xu | H04W 56/001 |
| 2022/0271818 A1* | 8/2022 | Svendsen | H04B 7/0897 |

* cited by examiner

*Primary Examiner* — Ricardo H Castaneyra
(74) *Attorney, Agent, or Firm* — Haynes & Boone, LLP

(57) ABSTRACT

Wireless communications systems and methods related to monitoring and/or measuring synchronization signal blocks (SSBs) in one or more beam directions based on timing offsets associated with the beam directions are provided. In some aspects, a method of wireless communication performed by a user equipment (UE) includes: receiving, from a wireless communication device, a synchronization signal block (SSB); and measuring, based on timing offsets for each of a plurality of beams of the SSB, one or multiple beams of the SSB. In some instances, the UE determines a number of beams of the SSB to measure based on the timing offsets for each of the plurality of beams of the SSB.

30 Claims, 8 Drawing Sheets

TIMING-AWARE SCHEDULING

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

In a radio access network such as a NR network, a BS may transmit synchronization signals to allow UEs to search and acquire synchronization to a cell within the radio access network. In some instances, a BS may transmit synchronization signals repeatedly at a predetermined periodicity. When the network operates at high frequencies, for example, at about 6 GHz or above 6 GHz and including millimeter wave (mmWave), the path-loss may be high. To overcome the high path-loss, a BS may perform beamforming, which may include analog and/or digital beamforming, to create narrow beams for transmissions to UEs in the network. For example, the BS may transmit synchronization signals in different and/or multiple beam directions using transmission beams.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) includes: receiving, from a wireless communication device, a synchronization signal block (SSB); and measuring, based on timing offsets for each of a plurality of beams of the SSB, one or multiple beams of the SSB. In some instances, the UE determines, based on the timing offsets for each of the plurality of beams of the SSB, a number of beams of the SSB to measure.

In an additional aspect of the disclosure, a user equipment (UE) includes: a transceiver; and a processor in communication with the transceiver, wherein the UE is configured to: receive, from a wireless communication device, a synchronization signal block (SSB); and measure, based on timing offsets for each of a plurality of beams of the SSB, one or multiple beams of the SSB. In some instances, the UE determines, based on the timing offsets for each of the plurality of beams of the SSB, a number of beams of the SSB to measure.

In an additional aspect of the disclosure, a non-transitory computer-readable medium having program code recorded thereon for operation on a user equipment (UE) includes: code for causing the UE to receive, from a wireless communication device, a synchronization signal block (SSB); and code for causing the UE to measure, based on timing offsets for each of a plurality of beams of the SSB, one or multiple beams of the SSB. In some instances, the non-transitory computer-readable medium includes code for causing the UE to determine, based on the timing offsets for each of the plurality of beams of the SSB, a number of beams of the SSB to measure.

In an additional aspect of the disclosure, a user equipment (UE) includes: means for receiving, from a wireless communication device, a synchronization signal block (SSB); and means for measuring, based on timing offsets for each of a plurality of beams of the SSB, one or multiple beams of the SSB. In some instances, the UE includes means for determining, based on the timing offsets for each of the plurality of beams of the SSB, a number of beams of the SSB to measure.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
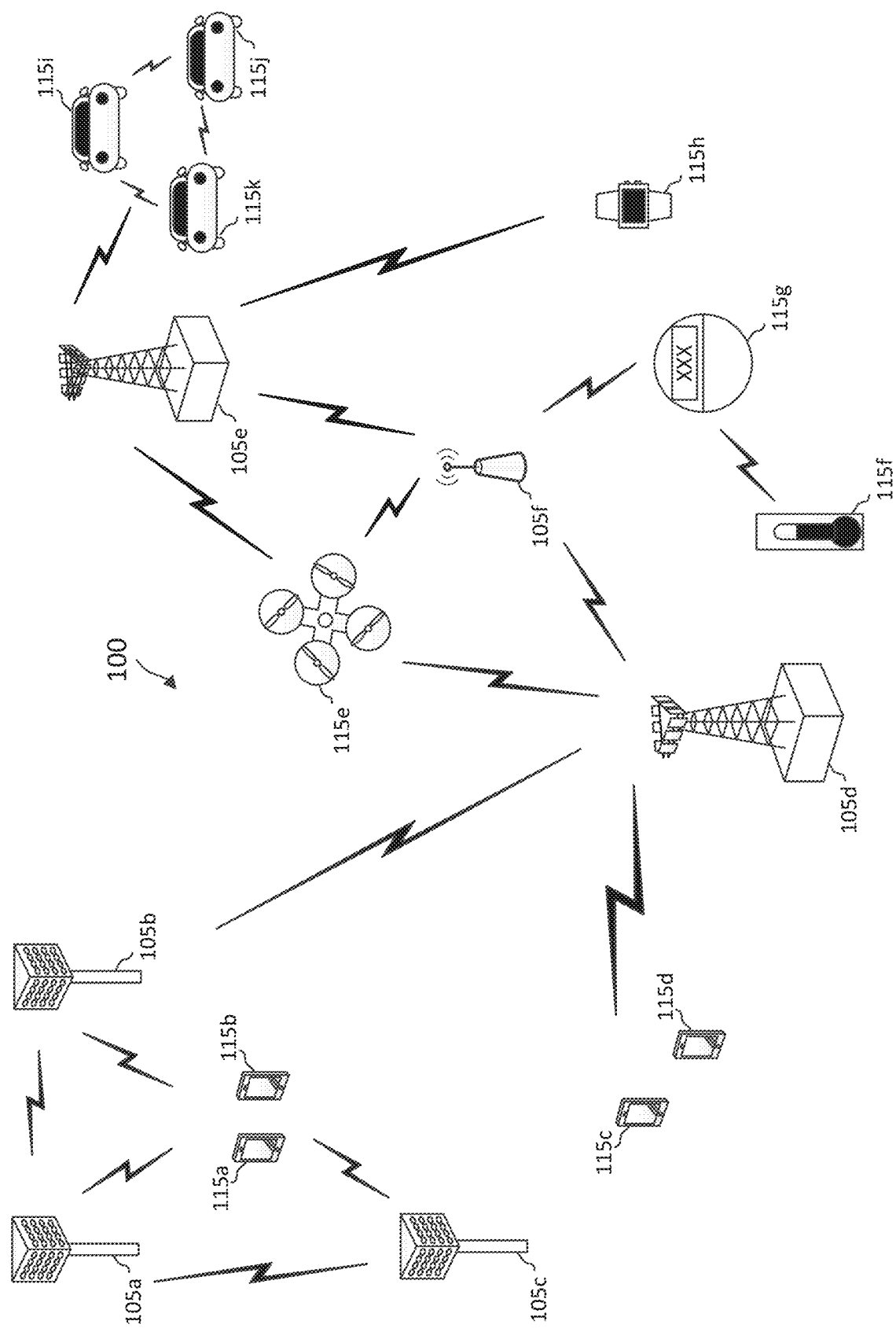
FIG. 1 illustrates a wireless communications network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G)) network. The 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

Aspects of the present disclosure can include a UE measuring, based on timing offsets for each of a plurality of beams, one or multiple beams of a synchronization signal block (SSB), which can provide several benefits. For example, by measuring multiple beams per SSB, the UE may complete the beam refinement process more quickly and/or more accurately than monitoring a single beam per SSB. As a result, the UE can more quickly and/or more accurately indicate to the BS (or other wireless communication devices) which beam(s) are most suitable for communicating with the UE. Therefore, for UEs implementing aspects of the present disclosure, network resources can be allocated more efficiently and/or effectively. This can lead to better spectral efficiency, higher network throughput, lower power consumption, and/or higher user satisfaction compared to previous approaches.

FIG. 1 illustrates a wireless communications network 100 according to some aspects of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively s geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive Multiple Input-Multiple Output (MIMO). The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless communications network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing the wireless communications network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/frequency-division duplexing (FDD) communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In some instances, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In some aspects, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity (ID) value, which may be combined with the physical layer identity value to identify the cell. The SSS may also enable detection of a duplexing mode and a cyclic prefix length. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some instances, the network 100 may operate in a licensed spectrum, a shared spectrum, and/or an unlicensed spectrum. In some instances, the operating spectrum may be located at frequencies of about 5-6 GHz or above 6 GHz, including millimeter-wave (mmWave) that may be in frequencies between about 30 GHz and about 300 GHz. When a BS 105 operates at a high-frequency range, the BSs 105 may communicate with the UEs 115 using narrow directional beams to overcome the high path-loss in the high-frequency range. For example, the BS 105 may transmit synchronization signal blocks (SSBs), including PSSs, SSSs, PBCH signals, and/or other discovery signals using directional beams. The BS 105 may transmit the SSBs, including the PSSs, SSSs, and/or PBCH signals, in multiple beam directions to allow UEs 115 located in different directions with respect to the BS 105 to synchronize to the BS 105. In some instances, the BS 105 may transmit different SSBs with a different beam direction and/or a different combinations of beam directions.

Figure 2:
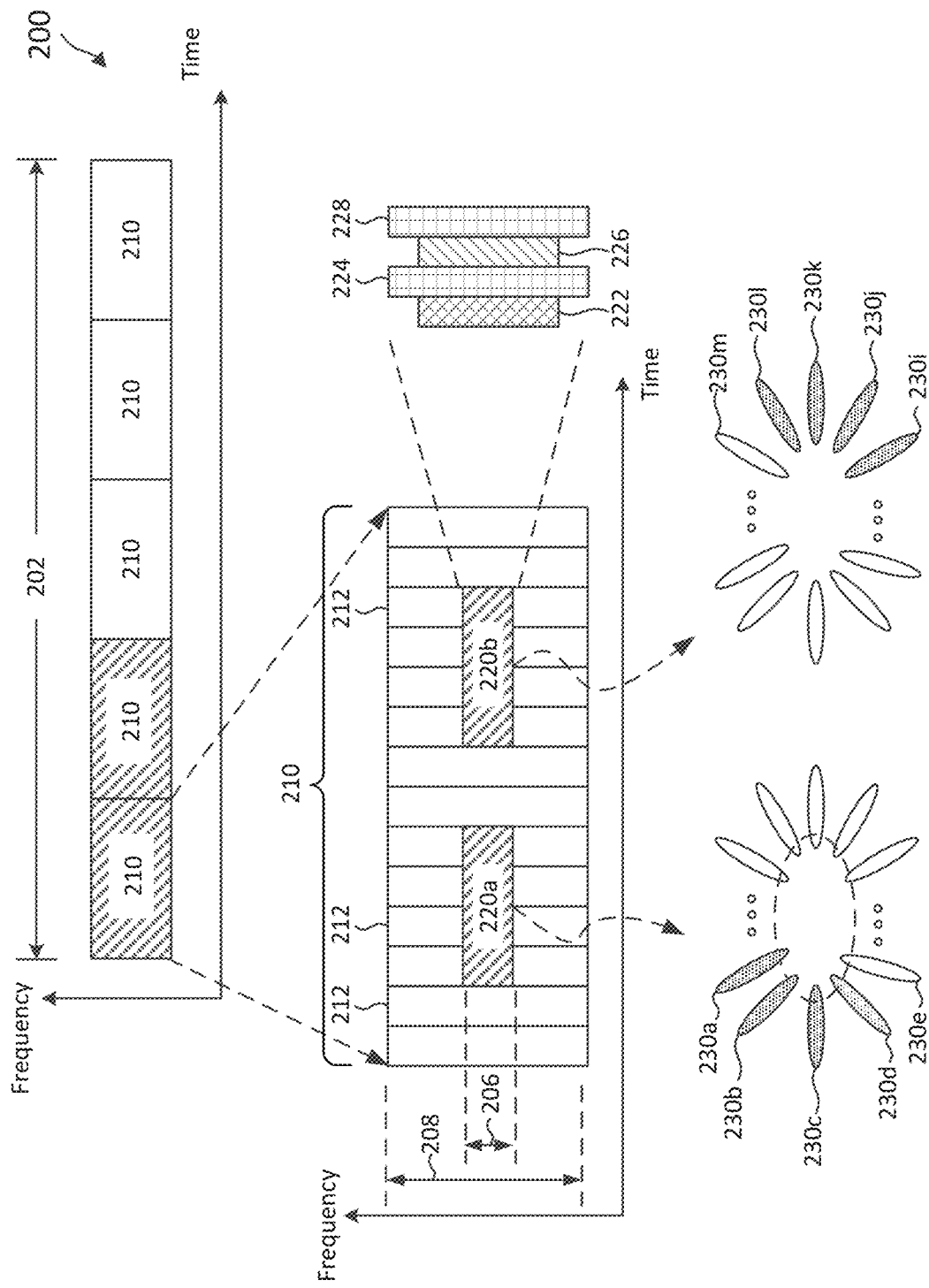
FIG. 2 illustrates a synchronization signal block (SSB) transmission scheme according to some aspects of the present disclosure.

FIG. 2 illustrates a synchronization signal block (SSB) transmission scheme 200 according to some aspects of the present disclosure. The x-axis represents time in some constant units, and the y-axis represents frequency in some constant units. The scheme 200 may be employed by BSs (e.g., BSs 105) and/or UEs (e.g., UEs 115) in a network (e.g., network 100). The scheme 200 illustrates a plurality of transmission slots 210 in a frequency band 208 over a measurement window 202. Each transmission slot 210 includes a plurality of symbols 212. The frequency band 208 may be located at frequencies of about sub-6 GHz or above 6 GHz, including millimeter-wave (mmWave) that may be in frequencies between about 30 GHz and about 300 GHz. In some instances, the frequency band 208 may be in a licensed spectrum, an unlicensed spectrum, and/or a shared spectrum. A transmission slot 210 may correspond to a subframe or a slot within a subframe. A symbol 212 may correspond to an OFDM symbol.

The BS may transmit SSBs in one or more of the transmission slots 210 during the measurement window 202, which may include any suitable amount of time. In an example, the measurement window 202 may be a discovery reference signal (DRS) measurement timing configuration (DMTC) window. In some instances, the measurement window 202 may be repeated at a predetermined periodicity (e.g., at about 5 ms, 10 ms, 20 ms, 40 ms, 80 ms, or 100 ms), where a BS may periodically transmit the SSBs.

The number of transmission slots 210 within the measurement window 202 may vary depending on the subcarrier spacing (SCS) and the number of symbols 212 within a transmission slot 210. In some instances, each transmission slot 210 may include about fourteen symbols 212. When the SCS is about 15 kilohertz (kHz), each transmission slot 210 may span about 1 ms and the measurement window 202 may include about five transmission slots 210. When the SCS is about 30 kHz, each transmission slot 210 may span about 0.5 ms and the measurement window 202 may include about ten transmission slots 210. When the SCS is about 120 kHz, each transmission slot 210 may span about 0.125 ms and the measurement window 202 may include about forty transmission slots 210. When the SCS is about 240 kHz, each transmission slot 210 may span about 62.5 microseconds (μs) and the measurement window 202 may include about eighty transmission slots 210.

In the scheme 200, a BS may transmit L number of SSBs during the measurement window 202, where L is a positive integer. Each SSB may span about four symbols 212. Thus, each transmission slot 210 may include about two SSBs (e.g., SSBs 220a and 220b). As shown, a SSB 220a may be transmitted in the third, fourth, fifth, sixth symbols 212 of a transmission slot 210 and another SSB 220b may transmitted in the ninth, tenth, eleventh, and twelve symbols 212 of the transmission slot 210. In some other instances, the SSBs 220a and 220b may be transmitted during other symbols 212 within the transmission slot 210. L may have a value of about 4, 8, or 64 depending on the SCS and the measurement window 202. In some aspects, L may be about 4 or 8 for a SCS of about 15 kHz or about 30 kHz. When L is 4, a BS may transmit four SSBs in two transmission slots 210 within the measurement window 202. In some instances, the BS may transmit the SSBs in consecutive transmission slots 210. When L is 8, a BS may transmit eight SSBs in four transmission slots 210 (e.g., consecutively) within the measurement window 202. In some aspects, L may be about 64 for a SCS of about 120 kHz or about 240 kHz. Thus, a BS may transmit sixty-four SSBs in about thirty-two transmission slots 210 within the measurement window 202. In some instances, the BS may transmit the SSBs in groups of eight SSBs over four transmission slots 210 and the groups may be separated by one transmission slot 210.

The BS may transmit the SSBs over a frequency band 206. In some aspects, the frequency band 208 may correspond to a system bandwidth of a network and the frequency band 206 may have a substantially smaller bandwidth than the system bandwidth and may be located within the frequency band 208. The transmissions of the SSBs in the frequency band 206 may allow a UE to synchronize to the network by operating in a smaller bandwidth than the system bandwidth, thereby reducing UE implementation complexity.

During cell acquisition, a BS may perform discovery signal transmission by transmitting one or more synchronization signals (SSs) in a SS burst transmission. The SS burst may include a number of SSBs with each SSB transmitted over one or more beams. Each SSB may carry information including a PSS, a SSS, a PBCH signal, a cell ID for the SSB, a current beam index, a measurement window timing, and/or any discovery related reference signals. For example, as shown in FIG. 2, each of the SSBs 220a, 220b may include a PSS 222, a first PBCH 224, a SSS 226, and a second PBCH 228.

A BS may transmit each SSB in one or more beam directions during the measurement window 202. For example, the BS may include an array of antenna elements and may configure the array of antenna elements to form a transmission beam in a certain direction. The terms "transmission beam" and "beam" may be used interchangeably in the present disclosure. As shown in FIG. 2, transmission beams 230a, 230b, 230c, 230d, 230e, ..., 230i, 230j, 230k, 230l, 230m, etc. may have different patterns. One or more of the transmission beams 230a, 230b, 230c, 230d, 230e, ..., 230i, 230j, 230k, 230l, 230m, etc. may be utilized to the transmit the SSBs 220a, 220b. In this regard, the BS may transmit the PSS 222, the first PBCH 224, the SSS 226, and the second PBCH 228 of each of the SSBs 220a, 220b using one or more transmission beams. A UE may receive the transmissions of the PSS 222, the first PBCH 224, the SSS 226, and the second PBCH 228 of each of the SSBs 220a, 220b via the one or more transmission beams. In some instances, the SSB may include information transmitted to the UE for the purpose of synchronization along one or more of the beam directions.

The BS may utilize a predetermined number of beams (e.g., 1, 2, 3, 4, 5, 6, 7, 8, etc.) and/or a predetermined group of beams for transmitting each SSB. For example, as shown in FIG. 2, SSB 220a may be transmitted over transmission beams 230a, 230b, 230c, and 230d (as indicated by the shading of the beams), while SSB 220b may be transmitted over transmission beams 230i, 230j, 230k, and 230l (as also indicated by the shading of the beams). In other instances, the SSB 220a and/or the SSB 220b may be transmitted using other combination(s) of beams and/or a different number of beams (e.g., greater or fewer). In some instances, the SSBs 220a, 220b may each be transmitted using the same beams. In some instances, different measurement windows may have different beam patterns/groupings. For example, in some instances the beam patterns/groupings may be a function of the cell ID such that different cells may have different time varying beam patterns/groupings that may allow for better interference diversity when SSBs of multiple cells are transmitted at the same time.

Figure 3:
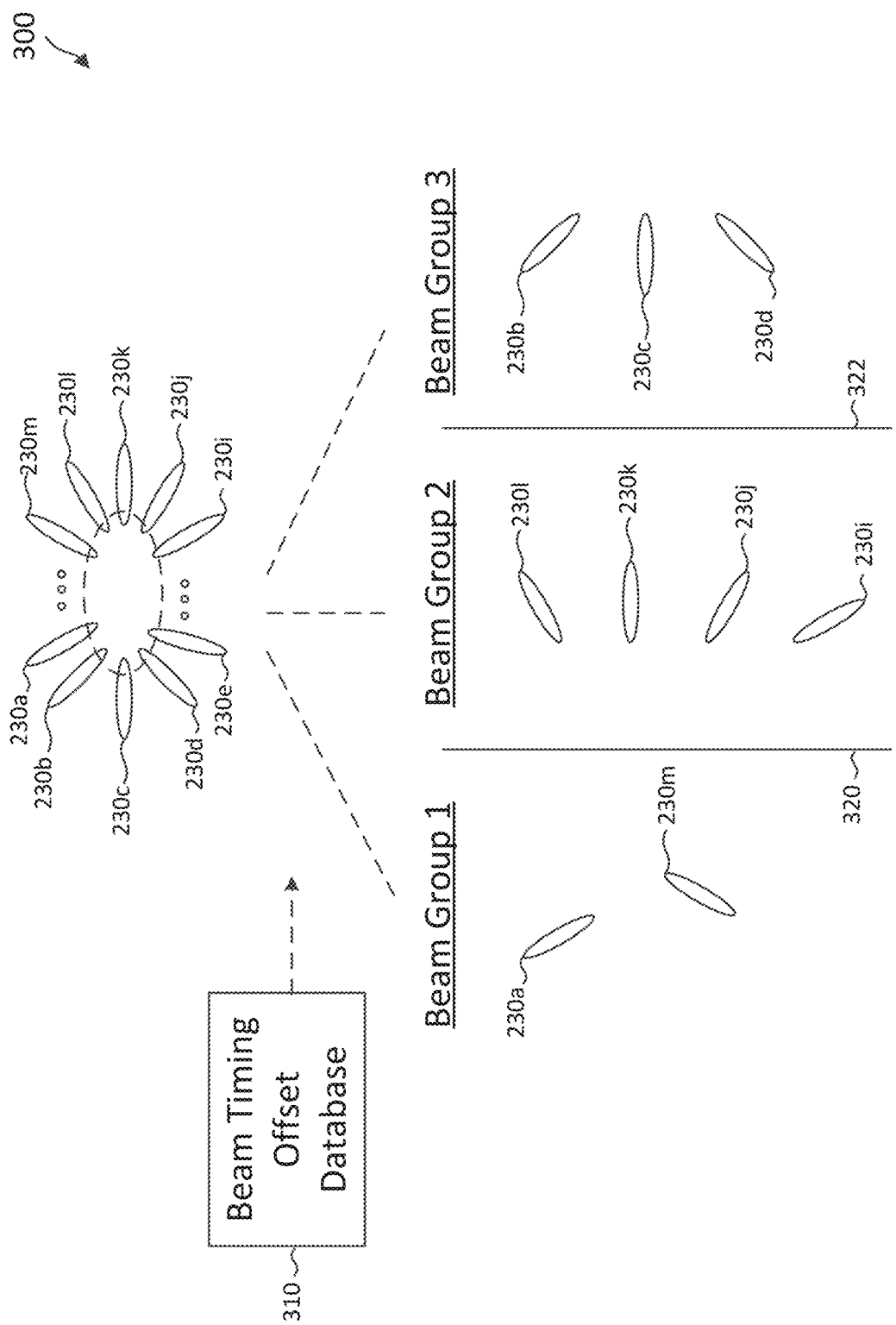
FIG. 3 illustrates a scheme for categorizing beams based on beam timing offset values according to some aspects of the present disclosure.

FIG. 3 illustrates a scheme 300 for categorizing beams based on beam timing offset values according to some aspects of the present disclosure. The scheme 300 may be employed by UEs (e.g., UEs 115) in a network (e.g., network 100). In this regard, in accordance with aspects of the present disclosure the scheme 300 may be utilized by a UE to determine how many beams to monitor for and/or measure. In particular, in some instances the UE may determine how many beams associated with an SSB to monitor for and measure based on the categorization of the beams into different groups based on associated beam timing offset values. In this regard, the SSB may be transmitted by a wireless communication device (e.g., a BS 105 and/or a UE 115) in one or more beam directions (e.g., using one or more of transmission beams 230a, 230b, 230c, 230d, 230e, ..., 230i, 230j, 230k, 230l, 230m, etc.). Accordingly, in accordance with aspects of the present disclosure the UE may categorize the transmission beams 230a, 230b, 230c, 230d, 230e, ..., 230i, 230j, 230k, 230l, 230m, etc. associated with the SSB and/or the BS 105 based on the respective timing offset values of the transmission beams.

As shown in FIG. 3, the transmission beams 230a, 230b, 230c, 230d, 230e, ..., 230i, 230j, 230k, 230l, 230m, etc. may be categorized into different groups (e.g., Beam Group 1, Beam Group 2, or Beam Group 3) based on the respective timing offset values of the transmission beams. While three groups are shown in FIG. 3, any suitable number of groups may be utilized including two groups, four groups, or a larger number of groups. The transmission beams 230a, 230b, 230c, 230d, 230e, ..., 230i, 230j, 230k, 230l, 230m, etc. may be categorized into the different groups based on comparing the timing offset value for each transmission beam to one or more thresholds (e.g., one, two, three, or other suitable number of thresholds).

The timing offset value for each of the transmission beams 230a, 230b, 230c, 230d, 230e, ..., 230i, 230j, 230k, 230l, 230*m*, etc. may be based on one or more measurements stored in a measurement database of the UE, such as beam timing offset database 310. In this regard, each of the timing offset values in the beam timing offset database 310 may represent a timing offset between a primary transmission beam of the UE and another transmission beam associated with the BS and/or an SSB. Accordingly, each transmission beam 230*a*, 230*b*, 230*c*, 230*d*, 230*e*, . . . , 230*i*, 230*j*, 230*k*, 230*l*, 230*m*, etc. may have a corresponding timing offset stored in the beam timing offset database 310 of the UE. In some instances, a primary beam of the UE may have a timing offset of zero.

Threshold values may be utilized by the UE as boundaries to separate the transmission beams into different groups. For example, the UE may categorize the plurality of transmission beams 230*a*, 230*b*, 230*c*, 230*d*, 230*e*, . . . , 230*i*, 230*j*, 230*k*, 230*l*, 230*m*, etc. based on comparing the associated timing offset values of each transmission beam to thresholds 320 and 322. That is, the thresholds 320 and 322 may be utilized by the UE to separate the transmission beams 230*a*, 230*b*, 230*c*, 230*d*, 230*e*, . . . , 230*i*, 230*j*, 230*k*, 230*l*, 230*m*, etc. into three groups (e.g., Beam Group 1, Beam Group 2, and Beam Group 3). In some instances, the UE may categorize the transmission beams 230*a*, 230*b*, 230*c*, 230*d*, 230*e*, . . . , 230*i*, 230*j*, 230*k*, 230*l*, 230*m*, etc. based on the following grouping criteria: Beam Group 1>Threshold 320≥Beam Group 2>Threshold 320≥Beam Group 3. That is, transmission beams with a timing offset greater than the threshold 320 may be placed in a first group (e.g., Beam Group 1), transmission beams with a timing offset less than or equal to threshold 320 but greater than threshold 322 may be placed in a second group (e.g., Beam Group 2), and transmission beams with a timing offset less than threshold 322 may be placed in a third group (e.g., Beam Group 3). In some instances, the thresholds 320 and 322 are based on cyclic prefix (CP) length. For example, the thresholds 320 and 322 may have a value between about 0.1 CP and about 5 CP (e.g., where 1 CP is about 600 ns for a 120 kHz subcarrier spacing). For example, in some instances the threshold 320 is about 0.5 CP and the threshold 322 is about 3 CP. In other instances, the threshold(s) utilized to separate the transmission beams 230*a*, 230*b*, 230*c*, 230*d*, 230*e*, . . . , 230*i*, 230*j*, 230*k*, 230*l*, 230*m*, etc. into different groups may have different values based on CP length and/or based on a time value that is unrelated to or decoupled from CP length.

As shown in FIG. 3, transmission beams 230*a* and 230*m* are categorized in Beam Group 1, transmission beams 230*i*, 230*j*, 230*k*, and 230*l* are categorized in Beam Group 2, and transmission beams 230*b*, 230*c*, and 230*d* are categorized in Beam Group 3.

Each of the beam groups (e.g., Beam Group 1, Beam Group 2, or Beam Group 3) may be associated with a particular number of beams that can be measured for each SSB. In this manner, the number of beams measured for each SSB (e.g., 1, 2, 3, or 4 beams) may be based on the beam timing offset(s) of the transmission beams 230*a*, 230*b*, 230*c*, 230*d*, 230*e*, . . . , 230*i*, 230*j*, 230*k*, 230*l*, 230*m*, etc. and/or the associated categorization of the transmission beams into the beam groups. For example, in some instances, the transmission beams in Beam Group 1 are associated with measuring a single transmission beam per SSB. Because the transmission beams in Beam Group 1 (e.g., transmission beams 230*a* and 230*m*) have a larger timing offset, the measurements associated with those transmission beams may be more likely to be inaccurate (and potentially lead to improper beam refinement) compared to the transmission beams with shorter timing offsets (e.g., the transmission beams in Beam Group 2 and Beam Group 3). In some instances, the SSS symbol is measured by the UE when a single transmission beam (e.g., a beam from Beam Group 1, such as transmission beam 230*a*, transmission beam 230*m*, or other beam in Beam Group 1) is measured per SSB. In other instances, the PSS, the first PBCH, or the second PBCH may be measured when a single transmission beam is measured per SSB.

In some instances, transmission beams in Beam Group 2 are associated with measuring two transmission beams per SSB. In this regard, because the transmission beams in the Beam Group 2 (e.g., transmission beams 230*i*, 230*j*, 230*k*, and 230*l*) have a lower timing offset than the transmission beams in Beam Group 1, the measurements associated with the transmission beams in Beam Group 2 may be more accurate (and potentially lead to better beam refinement). Further, by measuring multiple transmission beams for a single SSB, the beam refinement process can be completed more quickly compared to measuring a single transmission beam per SSB. In some instances, the first PBCH symbol and the second PBCH symbol are measured by the UE when two transmission beams (e.g., two beams from Beam Group 2, such as any two of transmission beams 230*i*, 230*j*, 230*k*, 230*l*, and/or other beams in Beam Group 2) are measured per SSB. In other instances, any two of the PSS, the first PBCH, the SSS, and/or the second PBCH may be measured when two transmission beams are measured per SSB.

In some instances, transmission beams in Beam Group 3 are associated with measuring three transmission beams per SSB. In this regard, because the transmission beams in Beam Group 3 (e.g., transmission beams 230*b*, 230*c*, and 230*d*) have a lower timing offset than the transmission beams in Beam Group 1 and Beam Group 2, the measurements associated with the transmission beams in Beam Group 3 may be more accurate (and potentially lead to better beam refinement). Further, by measuring three transmission beams for a single SSB, the beam refinement process can be completed even more quickly compared to measuring one or two transmission beams per SSB. In some instances, the first PBCH symbol, the SSS, and the second PBCH symbol are measured by the UE when three transmission beams (e.g., three beams from Beam Group 3, such as any three of transmission beams 230*b*, 230*c*, 230*d*, and/or other beams in Beam Group 3) are measured per SSB. In other instances, any three of the PSS symbol, the first PBCH symbol, the SSS symbol, and/or the second PBCH symbol may be measured when three transmission beams are measured per SSB.

In some instances, the timing offset of a transmission beam will change over time (e.g., due to movement of the UE and/or other changes in interference, obstructions, network environment, or otherwise). As a result, the beam groups the transmission beams are categorized into may change over time. Therefore, the number of beams the UE determines to measure per SSB may also change over time. In this regard, the beam timing offset database may be updated from time to time, including periodically, upon a trigger, and/or otherwise, to reflect the current or most recent timing offset for each beam. Accordingly, in some instances, the UE determines a first number of beams of the SSB to measure based on the timing offsets for each of the plurality of beams of the SSB at a first time and determines a second, different number of beams of the SSB to measure based on the timing offsets for each of the plurality of beams of the SSB at a second, different time.

It should be understood that while the example above utilized three groups of transmission beams (i.e., Beam Group 1, Beam Group 2, and Beam Group 3), in other instances a different number of groups (e.g., 2 or 4) may be utilized. In some aspects, four groups may be utilized by the UE such that each group is associated with measuring one, two, three, or four transmission beams per SSB. In this regard, when four transmission beams are measured per SSB, the UE may measure the PSS symbol, the first PBCH symbol, the SSS symbol, and the second PBCH symbol.

Figure 4:
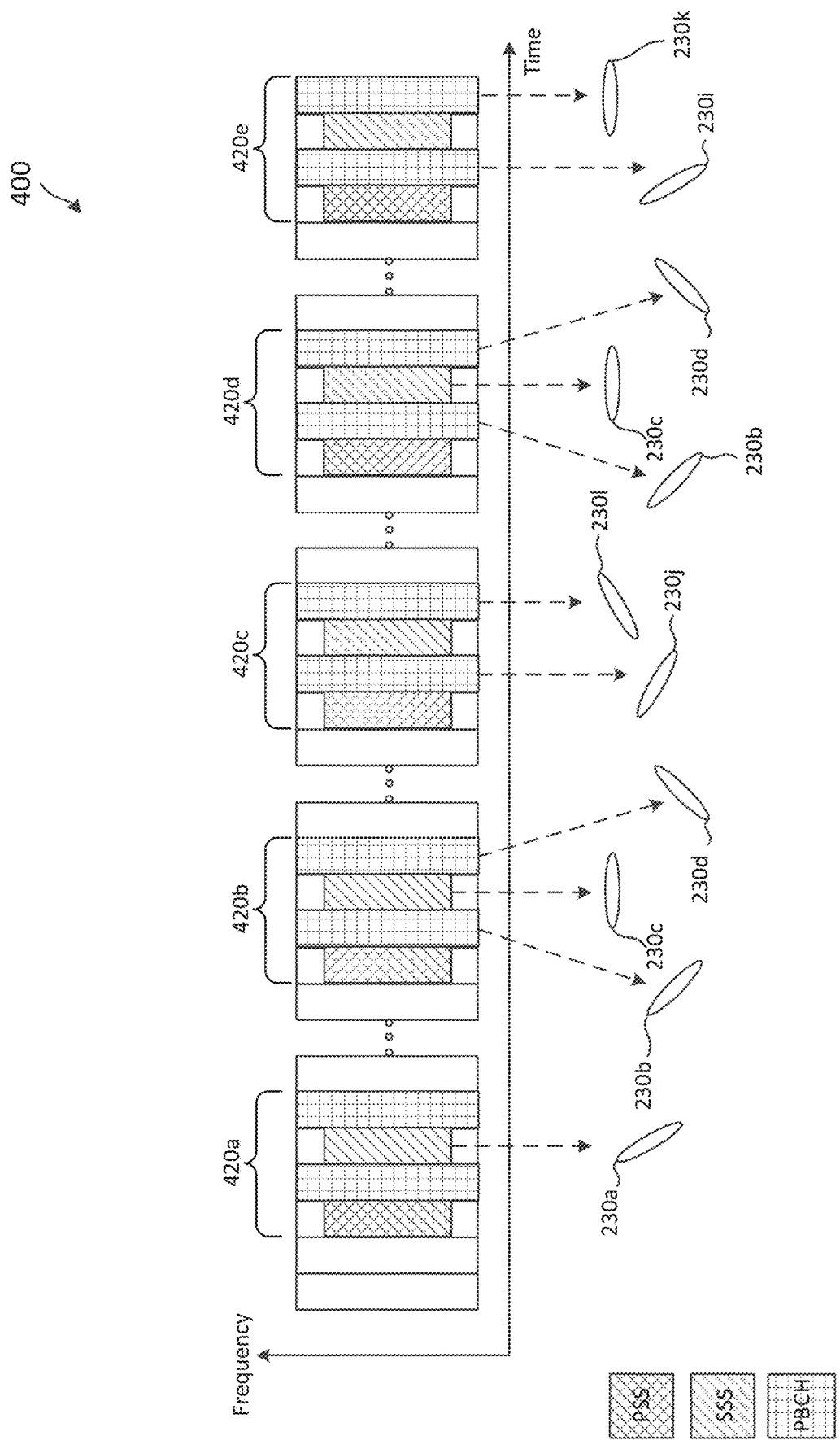
FIG. 4 illustrates an SSB monitoring and measurement scheme according to some aspects of the present disclosure.

FIG. 4 illustrates an SSB monitoring and measurement scheme 400 according to some aspects of the present disclosure. The scheme 400 may be employed by UEs (e.g., UEs 115) in a network (e.g., network 100). In this regard, in accordance with aspects of the present disclosure the scheme 400 may be utilized by a UE to measure one or more beams of a SSB. In particular, in some instances the UE may monitor for and measure one or more beams of the SSB in accordance with the categorization of the beams into different groups based on associated beam timing offset values as discussed above in the context of FIG. 3.

FIG. 4 shows the transmission of SSBs 420a, 420b, 420c, 420d, and 420e by a wireless communication device (e.g., BS 105) and associated monitoring and measuring of one or more beams of the SSBs 420a, 420b, 420c, 420d, and 420e by a UE (e.g., UE 115). As shown, each SSB includes a PSS symbol, a first PBCH symbol, a SSS symbol, and a second PBCH symbol. Each of the SSBs 420a, 420b, 420c, 420d, and 420e and/or the associated symbols may be transmitted in one or more beam directions (e.g., using one or more of transmission beams 230a, 230b, 230c, 230d, 230e, . . . , 230i, 230j, 230k, 230l, 230m, etc.). In accordance with aspects of the present disclosure, the UE may monitor for and/or measure one or multiple of the transmission beams 230a, 230b, 230c, 230d, 230e, . . . , 230i, 230j, 230k, 230l, 230m, etc. for each of the SSBs 420a, 420b, 420c, 420d, and 420e. In this regard, for sake of clarity and continuity, the examples illustrated in FIG. 4 are based upon the exemplary groupings of transmission beams 230a, 230b, 230c, 230d, 230e, . . . , 230i, 230j, 230k, 230l, 230m, etc. into Beam Group 1, Beam Group 2, and Beam Group 3 as shown and described with respect to FIG. 3. However, in other aspects other beam groupings, including having different numbers of groups and/or having different transmission beams in each group, may be utilized.

As shown in FIG. 4, for SSB 420a the UE monitors for and measures single beam, namely transmission beam 230a. In this regard, since transmission beam 230a is categorized in Beam Group 1 that is associated with a larger timing offset (e.g., greater than threshold 320), only transmission beam 230a is measured for SSB 420a. In the illustrated example, the transmission beam 230a is measured with respect to the SSS symbol of SSB 420a. However, in other instances the UE may measure the transmission beam 230a with respect to any of the PSS symbol, the first PBCH symbol, the SSS symbol, and/or the second PBCH symbol of SSB 420a.

For SSB 420b, the UE monitors for and measures three beams, namely transmission beams 230b, 230c, and 230d. In this regard, since transmission beams 230b, 230c, and 230d are categorized in Beam Group 3 that is associated with a smaller timing offset (e.g., less than threshold 322), all three transmission beams 230b, 230c, and 230d are measured for SSB 420b. In the illustrated example, the transmission beam 230b is measured with respect to the first PBCH symbol of SSB 420b, the transmission beam 230c is measured with respect to the SSS symbol of SSB 420b, and the transmission beam 230d is measured with respect to the second PBCH symbol of SSB 420b. However, in other instances the UE may measure the transmission beams 230b, 230c, and 230d with respect to any combination of the PSS symbol, the first PBCH symbol, the SSS symbol, and/or the second PBCH symbol of SSB 420b.

For SSB 420c, the UE monitors for and measures two beams, namely transmission beams 230j and 230l. In this regard, since transmission beams 230j and 230l are categorized in Beam Group 2 that is associated with an intermediate timing offset (e.g., greater than threshold 322, but less than threshold 320), two transmission beams 230j and 230l are measured for SSB 420c. In the illustrated example, the transmission beam 230j is measured with respect to the first PBCH symbol of SSB 420c and the transmission beam 230l is measured with respect to the second PBCH symbol of SSB 420c. However, in other instances the UE may measure the transmission beams 230j and 230l with respect to any combination of the PSS symbol, the first PBCH symbol, the SSS symbol, and/or the second PBCH symbol of SSB 420c.

For SSB 420d, the UE monitors for and measures three beams, namely transmission beams 230b, 230c, and 230d. In this regard, in some instances SSB 420d may be a retransmission of SSB 420b and/or a later transmission of an SSB similar to SSB 420b. Since transmission beams 230b, 230c, and 230d are categorized in Beam Group 3 that is associated with a smaller timing offset (e.g., less than threshold 322), all three transmission beams 230b, 230c, and 230d are measured for SSB 420d in a similar manner to that illustrated and described with respect to SSB 420b.

For SSB 420e, the UE monitors for and measures two beams, namely transmission beams 230i and 230k. In this regard, in some instances SSB 420e may be a retransmission of SSB 420c and/or a later transmission of an SSB similar to SSB 420c. Since transmission beams 230i and 230k are categorized in Beam Group 2 that is associated with an intermediate timing offset (e.g., greater than threshold 322, but less than threshold 320), two transmission beams 230i and 230k are measured for SSB 420c. In the illustrated example, the transmission beam 230i is measured with respect to the first PBCH symbol of SSB 420e and the transmission beam 230k is measured with respect to the second PBCH symbol of SSB 420e. However, in other instances the UE may measure the transmission beams 230i and 230k with respect to any combination of the PSS symbol, the first PBCH symbol, the SSS symbol, and/or the second PBCH symbol of SSB 420e.

By measuring multiple beams for one or more of the SSBs (e.g., SSBs 420b, 420c, 420d, and 420e), the UE may complete the beam refinement process more quickly and/or more accurately compared to monitoring a single beam per SSB. As a result, the UE can more quickly and/or more accurately indicate to the BS (or other wireless communication devices) which beam(s) are most suitable for communicating with the UE. Therefore, for UEs implementing aspects of the present disclosure, network resources can be allocated more efficiently and/or effectively. This can lead to better spectral efficiency, higher network throughput, lower power consumption, and/or higher user satisfaction compared to previous approaches.

Figure 5:
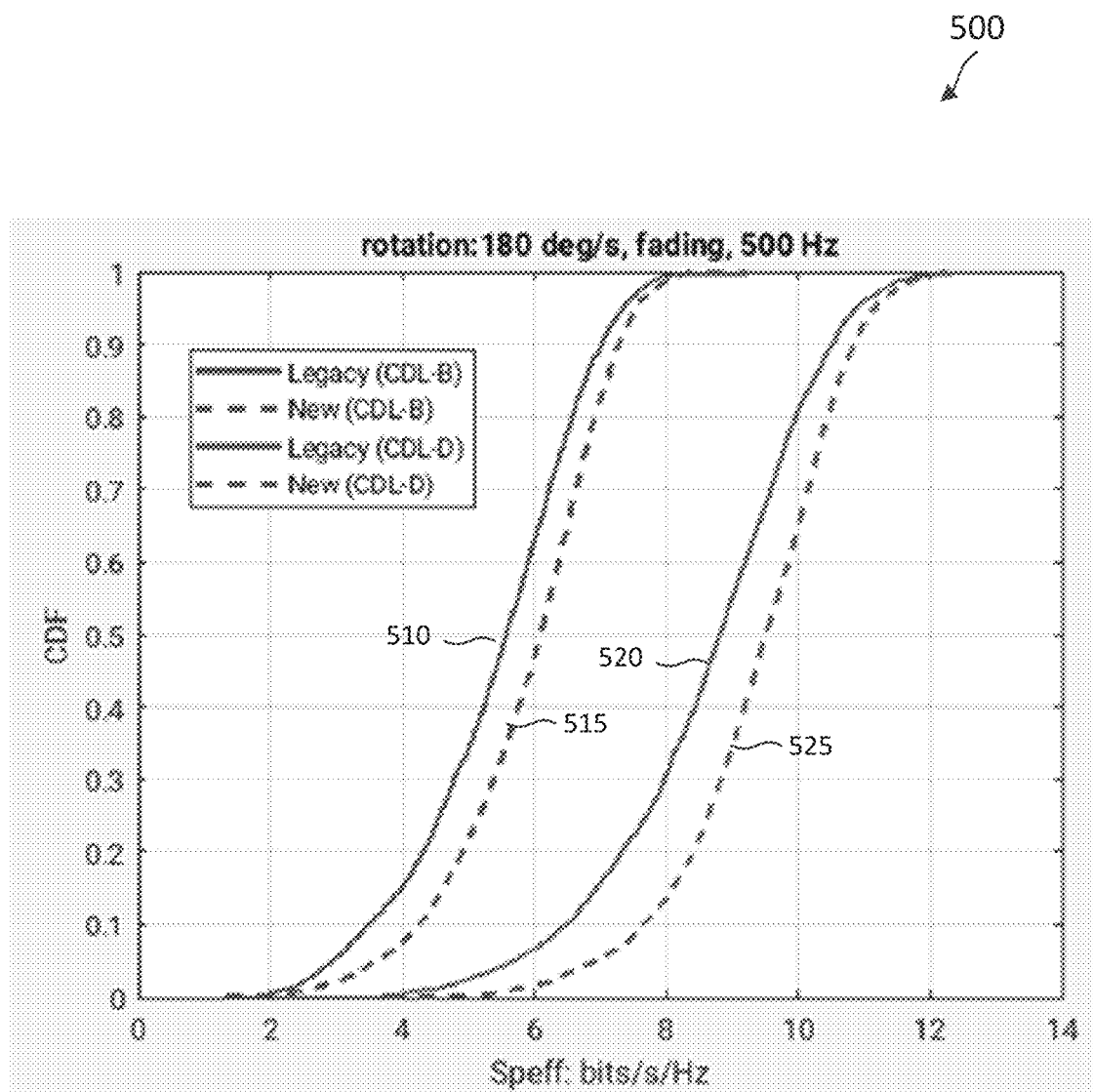
FIG. 5 illustrates a graph showing improved spectral efficiency according to some aspects of the present disclosure.

FIG. 5 illustrates a graph 500 showing improved spectral efficiency according to some aspects of the present disclosure. The graph 500 shows a comparison of spectral efficiency between legacy approaches and approaches of the present disclosure with cumulative-distribution-function (CDF) along the y-axis and spectral efficiency (bits/s/Hz) along the x-axis. In particular, the graph 500 shows a plot 510 of a legacy approach based on a clustered delay line (CDL)-B model, a plot 515 of an approach of the present disclosure based on a CDL-B model, a plot 520 of a legacy approach based on a CDL-D model, and a plot 525 of an approach of the present disclosure based on a CDL-D model. As shown in the graph 500, the approaches of the present disclosure provide a significant increase in spectral efficiency. In particular, the plots 510 and 515 show approximately a 23% gain in spectral efficiency at the tenth percentile, while the plots 520 and 525 show approximately a 18% gain in spectral efficiency at the tenth percentile.

Figure 6:
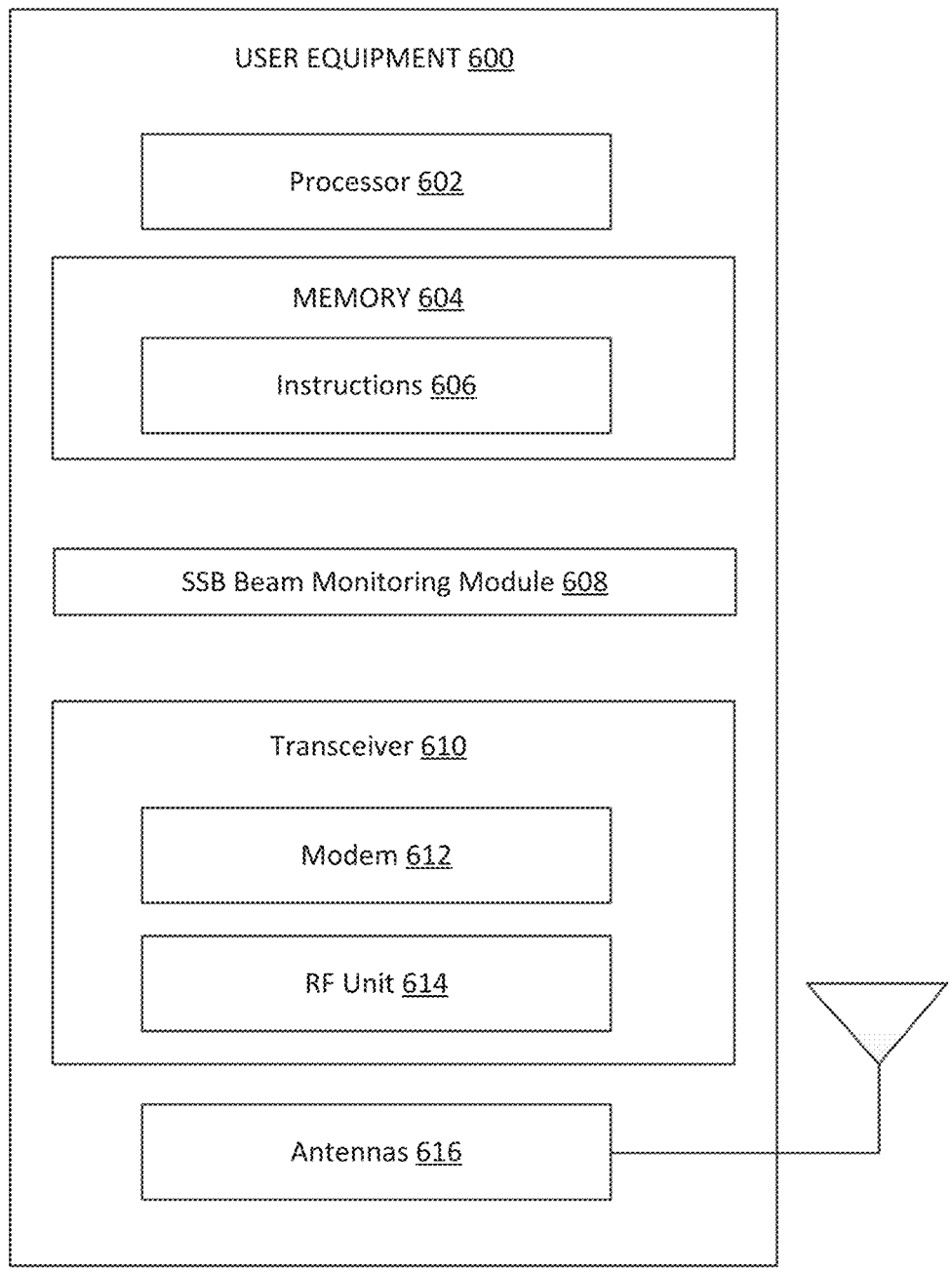
FIG. 6 illustrates a block diagram of a user equipment (UE) according to some aspects of the present disclosure.

FIG. 6 is a block diagram of a UE 600 according to aspects of the present disclosure. The UE 600 may be a UE 115 as discussed above. As shown, the UE 600 may include a processor 602, a memory 604, an SSB beam monitoring module 608, a transceiver 610 including a modem subsystem 612 and a RF unit 614, and an antenna 616. These elements may be in direct or indirect communication with each other, for example via one or more buses. In this regard, the components of the UE 600 may be configured to operate individually and/or collectively to perform one or more of the functions discussed with respect to FIGS. 2-5 and 8.

The processor 602 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with FIGS. 2-4 and 8 or other aspects of the present disclosure. Instructions 606 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The SSB beam monitoring module 608 may be used for various aspects of the present disclosure. For example, the SSB beam monitoring module 608 may be configured to receive a synchronization signal block (SSB) from a wireless communication device (e.g., a BS 105 and/or a UE 115). The SSB beam monitoring module 608 may be configured to measure, based on timing offsets for each of a plurality of beams of the SSB, one or multiple beams of the SSB. The SSB beam monitoring module 608 may be configured to measure one, two, three, or four beams of the received SSB. In this regard, the SSB beam monitoring module 608 may measure the RSRP (or other measurement value) for one or more of the PSS symbol, the first PBCH symbol, the SSS symbol, or the second PBCH symbol of the SSB for one or more beam directions.

In some instances, the SSB beam monitoring module 608 may be configured to determinee a number of beams of the SSB to measure based on the timing offsets for each of the plurality of beams of the SSB. For example, in some instances the SSB beam monitoring module 608 may be configured to group the transmission beams (e.g., into one, two, three, four, or other suitable number of groups) based on their respective timing offset values and determine the number of beams of the SSB to measure based on the respective grouping(s) of the transmission beam(s) of the SSB. In this regard, the SSB beam monitoring module 608 may be configured to group the transmission beams based on comparing the timing offset value for each transmission beam relative to one or more thresholds (e.g., one, two, three, or other suitable number of thresholds). That is, the SSB beam monitoring module 608 may be configured to determine the number of beams of the SSB to measure by comparing the timing offsets for each of the plurality of beams of the SSB to at least one threshold. In some instances, the SSB beam monitoring module 608 may be configured to utilize timing offsets based on one or more measurements stored in a measurement database of the UE 600. In some instances, the measurement database of the UE 600 is stored on the memory 604.

As shown, the transceiver 610 may include the modem subsystem 612 and the RF unit 614. The transceiver 610 can be configured to communicate bi-directionally with other devices, such as the BSs 105, other UEs 115, and/or another core network element. The modem subsystem 612 may be configured to modulate and/or encode the data from the memory 604, the SSB beam monitoring module 608 according to a modulation and coding scheme (MCS) (e.g., a low-density parity check (LDPC) coding scheme, a turbo coding scheme, a convolutional coding scheme, etc.). The RF unit 614 may be configured to process (e.g., perform analog to digital conversion or digital to analog conversion, etc.) modulated/encoded data from the modem subsystem 612 (on outbound transmissions) or of transmissions originating from another source such as a BS 105 and/or a UE 115. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of UL data according to aspects of the present disclosure. The antenna 616 may further receive data messages transmitted from other devices. For example, the antenna 616 may be configured to receive SSBs, including PSS, SSS, and/or PBCH, from a wireless communication device, such as a BS 105 or UE 115. The antenna 616 may provide the received communications for processing and/or demodulation at the transceiver 610. Although FIG. 6 illustrates antenna 616 as a single antenna, antenna 616 may include multiple antennas of similar or different designs. In some instances, multiple antennas can facilitate sustaining multiple transmission links and/or beamforming.

Figure 7:
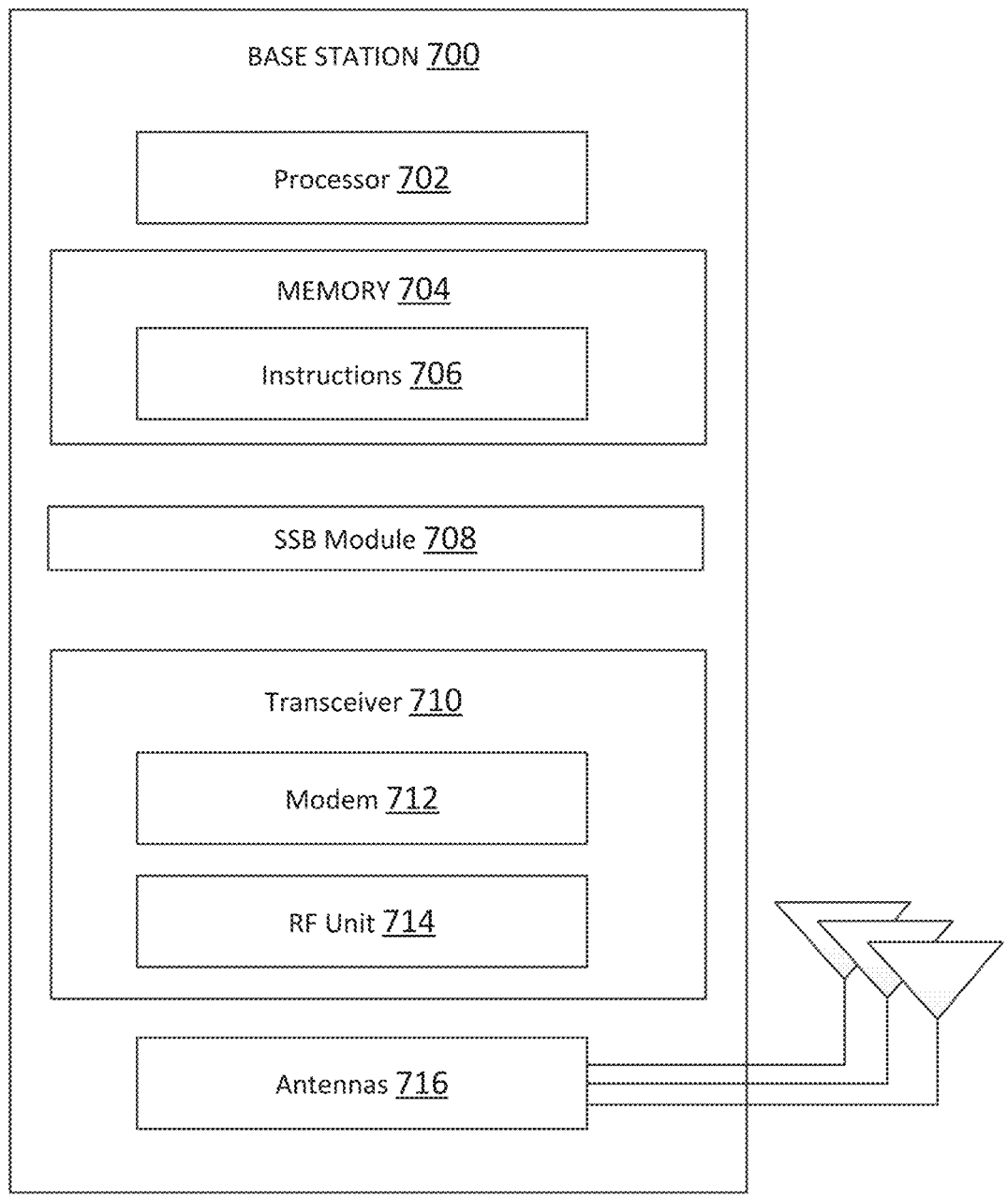
FIG. 7 illustrates a block diagram of a base station (BS) according to some aspects of the present disclosure.

FIG. 7 illustrates a block diagram of a BS 700 according to aspects of the present disclosure. The BS 700 may be a BS 105 as discussed above. As shown, the BS 700 may include a processor 702, a memory 704, a beam pattern module 708, a measurement window module 909, a transceiver 710 including a modem subsystem 712 and a RF unit 714, and antennas 716. These elements may be in direct or indirect communication with each other, for example via one or more buses. In this regard, the components of the BS 700 may be configured to operate individually and/or collectively to perform one or more of the functions discussed with respect to FIGS. 2, 4, and 5 or other aspects of the present disclosure.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 602), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform the operations described herein with reference to the BS 105 in connection with FIGS. 2, 4, and 5 or other aspects of the present disclosure. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SSB module 708 may be used for various aspects of the present disclosure. For example, the SSB module 708 may be configured to transmit SSBs along one or multiple beam directions. The SSB module 708 may also be configured to receive an indication from a UE of one or more beam directions most suitable for communicating with the UE. In some instances, the SSB module 708 and/or other component(s) of the BS 700 may be further configured to allocate network resources to a UE for downlink and/or uplink communications.

As shown, the transceiver 710 may include the modem subsystem 712 and the RF unit 714. The transceiver 710 can be configured to communicate bi-directionally with other devices, such as the UEs 115 and/or another core network element. The modem subsystem 712 may be configured to modulate and/or encode data according to a modulation and coding scheme (MCS) (e.g., a LDPC coding scheme, a turbo coding scheme, a convolutional coding scheme, etc.). The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115. Although shown as integrated together in transceiver 710, the modem subsystem 712 and the RF unit 714 may be separate devices that are coupled together at the BS 105 to enable the BS 105 to communicate with other devices.

The RF unit 714 may provide the modulated and/or processed data, e.g., data packets (or, more generally, data messages that may contain one or more data packets and other information), to the antennas 716 for transmission to one or more other devices. For example, the antennas 616 may be configured to transmit SSBs, including PSS, SSS, and/or PBCH, via one or more beam directions to UEs 115 in accordance with the present disclosure. In this regard, the antennas 716 may be used for beamforming to transmit communications using different transmission beams. The antennas 716 may further receive data messages transmitted from other devices (e.g., UEs 115 and/or BSs 105) and provide the received communications for processing and/or demodulation at the transceiver 710.

Figure 8:
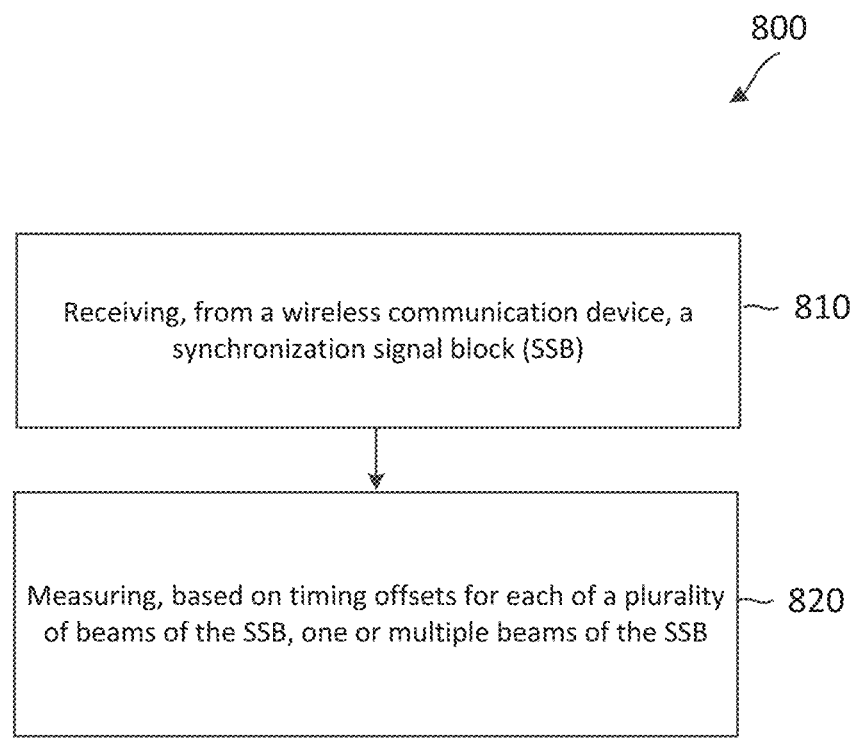
FIG. 8 illustrates a flow diagram of a method of wireless communication according to some aspects of the present disclosure.

FIG. 8 is a flow diagram of a method 800 of wireless communication according to aspects of the present disclosure. Aspects of the method 800 can be executed by a UE, such as UEs 115, 600. As illustrated, the method 800 includes a number of enumerated aspects, but the method 800 may include additional aspects before, after, and in between the enumerated aspects. In some instances, one or more of the enumerated aspects may be omitted or performed in a different order.

At 810, the method 800 includes a UE (e.g., UE 115 or UE 600) receiving a synchronization signal block (SSB) from a wireless communication device (e.g., a BS 105 and/or a UE 115). In some instances, the UE receives an SSB including a primary synchronization signal (PSS) symbol, a first physical broadcast channel (PBCH) symbol, a secondary synchronization signal (SSS) symbol, and a second PBCH symbol. In this regard, the PSS symbol, the first PBCH symbol, the SSS symbol, and the second PBCH symbol may be received by the UE in consecutive symbols of a transmission slot. As discussed with respect to FIG. 2, the SSB received by the UE may be transmitted by the wireless communication device in one or more beam directions (e.g., using one or more of transmission beams 230a, 230b, 230c, 230d, 230e, ..., 230i, 230j, 230k, 230l, 230m, etc.). In this regard, the UE may receive the PSS, the first PBCH, the SSS, and the second PBCH of the SSB via the one or more transmission beams.

At 820, the method 800 includes the UE measuring, based on timing offsets for each of a plurality of beams of the SSB, one or multiple beams of the SSB. The UE may measure one, two, three, or four beams of the SSB. In this regard, the UE may measure Reference Signal Received Power (RSRP), Reference Signal Received Quality (RSRQ), Signal to Noise Ratio (SNR), Signal to Interference plus Noise Ratio (SINR); Signal to Noise plus Interference Ratio (SNIR), and/or pathloss for one or more symbols of the SSB for one or multiple beams of the SSB. In some instances, the UE receives the SSB including a primary synchronization signal (PSS) symbol, a first physical broadcast channel (PBCH) symbol, a secondary synchronization signal (SSS) symbol, and a second PBCH symbol. The UE may measure one, two, three, or four beams of the SSB. In this regard, the UE may measure the RSRP (or other measurement value) for one or more of the PSS symbol, the first PBCH symbol, the SSS symbol, or the second PBCH symbol of the SSB for one or more beam directions.

In some instances, the timing offsets are based on one or more measurements stored in a measurement database of the UE. The measurements stored in the measurement database may include offset values for one or more transmission beams. For example, each of the offset values may represent a timing offset between a primary transmission beam of the UE and another transmission beam. Accordingly, each transmission beam may have a corresponding timing offset stored in the measurement database of the UE. In some instances, the measurement database of the UE is stored on the memory (e.g., memory 604) of the UE.

In some instances, the UE determines a number of beams of the SSB to measure based on the timing offsets for each of the plurality of beams of the SSB. For example, in some instances the transmission beams are grouped (e.g., into one, two, three, four, or other suitable number of groups) based on their respective timing offset values and the UE determines the number of beams of the SSB to measure based on the respective grouping(s) of the transmission beam(s) of the SSB. In this regard, the transmission beams may be grouped based on comparing the timing offset value for each transmission beam relative to one or more thresholds (e.g., one, two, three, or other suitable number of thresholds). That is, the UE may determine the number of beams of the SSB to measure by comparing the timing offsets for each of the plurality of beams of the SSB to at least one threshold.

The threshold values may be utilized by the UE as boundaries to separate the transmission beams into the different groups. For example, the UE may categorize the plurality of beams of the SSB into at least a first group and a second group based on the comparing the timing offsets to one or more thresholds. The first group of beams may be associated with a first number of beams to be measured per SSB and the second group of beams may be associated with a second number of beams to be measured per SSB that is greater than the first number. In this regard, the second group of beams may be associated with a shorter timing offset than the first group. In this regard, the UE may determine the number of beams of the SSB to measure based on categorizing the plurality of beams of the SSB into groups.

In some instances two thresholds, T1 and T2, may be utilized by the UE to separate the transmission beams into three groups (e.g., Beam Group 1, Beam Group 2, and Beam Group 3 of FIG. 3). In some aspects, transmission beams with a timing offset greater than T1 are placed in a first group (e.g., Beam Group 1), transmission beams with a timing offset less than or equal to T1 but greater than T2 are placed in a second group (e.g., Beam Group 2), and transmission beams with a timing offset less than T2 are placed in a third group (e.g., Beam Group 3). In some instances, the thresholds, T1 and T2, are based on cyclic prefix (CP) length. For example, the thresholds, T1 and T2, may have a value between about 0.1 CP and about 5 CP (e.g., where 1 CP is about 600 ns for a 120 kHz subcarrier spacing). For example, in some instances the threshold T1 is about 0.5 CP and the threshold T2 is about 3 CP. In other instances, the threshold(s) utilized to separate the transmission beams into different groups may have different values based on CP length and/or based on a time value that is unrelated to or decoupled from CP length.

Each of the beam groups may be associated with a particular number of beams that can be measured for each SSB. For example, in some instances, transmission beams with a timing offset greater than T1 are placed in a first group (e.g., Beam Group 1) that is associated with measuring a single transmission beam per SSB. In this regard, because the transmission beams in the first group have a higher timing offset, the measurements associated with those transmission beams may be more likely to be inaccurate (and potentially lead to improper beam refinement) compared to the transmission beams with shorter timing offsets (e.g., the transmission beams in Beam Groups 2 and 3). In some instances, the SSS symbol is measured by the UE when a single transmission beam is measured per SSB. In other instances, the PSS, the first PBCH, or the second PBCH may be measured when a single transmission beam is measured per SSB.

In some instances, transmission beams with a timing offset less than or equal to T1 but greater than T2 are placed in a second group (e.g., Beam Group 2) that is associated with measuring two transmission beams per SSB. In this regard, because the transmission beams in the second group have a lower timing offset than the transmission beams in the first group, the measurements associated with those transmission beams may be more accurate (and potentially lead to better beam refinement). Further, by measuring multiple transmission beams for a single SSB, the beam refinement process can be completed more quickly compared to measuring a single transmission beam per SSB. In some instances, the first PBCH symbol and the second PBCH symbol are measured by the UE when two transmission beams are measured per SSB. In other instances, any two of the PSS, the first PBCH, the SSS, and/or the second PBCH may be measured when two transmission beams are measured per SSB.

In some instances, transmission beams with a timing offset less than T2 are placed in a third group (e.g., Beam Group 3) that is associated with measuring three transmission beams per SSB. In this regard, because the transmission beams in the third group have a lower timing offset than the transmission beams in the first and second groups, the measurements associated with those transmission beams may be more accurate (and potentially lead to better beam refinement). Further, by measuring three transmission beams for a single SSB, the beam refinement process can be completed even more quickly compared to measuring one or two transmission beams per SSB. In some instances, the first PBCH symbol, the SSS, and the second PBCH symbol are measured by the UE when three transmission beams are measured per SSB. In other instances, any three of the PSS symbol, the first PBCH symbol, the SSS symbol, and/or the second PBCH symbol may be measured when three transmission beams are measured per SSB.

In some instances, the timing offset of a transmission beam will change over time (e.g., due to movement of the UE and/or other changes in interference, obstructions, network environment, or otherwise). As a result, the beam groups the transmission beams are categorized into may change over time. Therefore, the number of beams the UE determines to measure per SSB may also change over time. Accordingly, in some instances, the UE determines a first number of beams of the SSB to measure based on the timing offsets for each of the plurality of beams of the SSB at a first time and determines a second, different number of beams of the SSB to measure based on the timing offsets for each of the plurality of beams of the SSB at a second, different time.

It should be understood that while the example above utilized three groups of transmission beams, in other instances a different number of groups (e.g., 2 or 4) may be utilized. In some aspects, four groups may be utilized by the UE such that each group is associated with measuring one, two, three, or four transmission beams per SSB. In this regard, when four transmission beams are measured per SSB, the UE may measure the PSS symbol, the first PBCH symbol, the SSS symbol, and the second PBCH symbol.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a wireless communication device, a synchronization signal block (SSB) on at least one of a plurality of beams for receiving the SSB; and
   measuring, based on timing offsets for each of the plurality of beams for receiving the SSB, at least one beam of the plurality of beams for receiving the SSB, wherein each of the plurality of beams for receiving the SSB are categorized into one or more groups based on the timing offsets for each of the plurality of beams for receiving the SSB.

2. The method of claim 1, further comprising:
   determining, based on the timing offsets for each of the plurality of beams for receiving the SSB, a number of beams for receiving the SSB to measure.

3. The method of claim 2, wherein the timing offsets are based on one or more measurements stored in a measurement database of the UE.

4. The method of claim 2, wherein the determining the number of beams for receiving the SSB to measure further comprises:
   comparing the timing offsets for each of the plurality of beams for receiving the SSB to at least one threshold.

5. The method of claim 4, further comprising:
   categorizing, based on the comparing the timing offsets to the at least one threshold, the plurality of beams for receiving the SSB into the one or more groups comprising at least a first group and a second group.

6. The method of claim 5, wherein the determining the number of beams for receiving the SSB to measure is further based on the categorizing the plurality of beams for receiving the SSB into at least the first group and the second group.

7. The method of claim 2, wherein the determining the number of beams for receiving the SSB to measure comprises:
   determining, based on the timing offsets for each of the plurality of beams for receiving the SSB at a first time, a first number of beams for receiving the SSB to measure; and
   determining, based on the timing offsets for each of the plurality of beams for receiving the SSB at a second time, a second number of beams for receiving the SSB to measure, wherein the second number of beams is different than the first number of beams.

8. The method of claim 1, wherein the measuring one or multiple beams for receiving the SSB comprises:
   measuring one, two, three, or four beams for receiving the SSB.

9. The method of claim 8, wherein:
   the receiving the SSB comprises receiving a primary synchronization signal (PSS) symbol, a first physical broadcast channel (PBCH) symbol, a secondary synchronization signal (SSS) symbol, and a second PBCH symbol; and
   the measuring one, two, three, or four beams for receiving the SSB comprises measuring reference signal received power (RSRP) for one or more of the PSS symbol, the first PBCH symbol, the SSS symbol, or the second PBCH symbol.

10. A user equipment (UE), comprising:
    a transceiver; and
    a processor in communication with the transceiver, wherein the UE is configured to:
    receive, from a wireless communication device, a synchronization signal block (SSB); and
    measure, based on timing offsets for each of a plurality of beams for receiving the SSB, one or multiple beams for receiving the SSB, wherein each of the plurality of beams are categorized into one or more groups based on the timing offsets for each of the plurality of beams for receiving the SSB.

11. The UE of claim 10, wherein the UE is further configured to:
    determine, based on the timing offsets for each of the plurality of beams for receiving the SSB, a number of beams for receiving the SSB to measure.

12. The UE of claim 11, further comprising:
    a memory in communication with the processor; and
    wherein the timing offsets are based on one or more measurements stored in a measurement database of the memory of the UE.

13. The UE of claim 11, wherein the UE is configured to determine the number of beams for receiving the SSB to measure by:
  comparing the timing offsets for each of the plurality of beams for receiving the SSB to at least one threshold.

14. The UE of claim 13, wherein the UE is further configured to:
  categorize, based on the comparing the timing offsets to the at least one threshold, the plurality of beams for receiving the SSB into the one or more groups comprising at least a first group and a second group.

15. The UE of claim 14, wherein the UE is configured to determine the number of beams for receiving the SSB to measure further based on the categorizing the plurality of beams for receiving the SSB into at least the first group and the second group.

16. The UE of claim 11, wherein the UE is configured to determine the number of beams for receiving the SSB to measure by:
  determining, based on the timing offsets for each of the plurality of beams for receiving the SSB at a first time, a first number of beams for receiving the SSB to measure; and
  determining, based on the timing offsets for each of the plurality of beams for receiving the SSB at a second time, a second number of beams for receiving the SSB to measure, wherein the second number of beams is different than the first number of beams.

17. The UE of claim 10, wherein the UE is configured to measure the one or multiple beams for receiving the SSB by:
  measuring one, two, three, or four beams for receiving the SSB.

18. The UE of claim 17, wherein:
  the UE is configured to receive the SSB by receiving a primary synchronization signal (PSS) symbol, a first physical broadcast channel (PBCH) symbol, a secondary synchronization signal (SSS) symbol, and a second PBCH symbol; and
  the UE is configured to measure one, two, three, or four beams for receiving the SSB by measuring reference signal received power (RSRP) for one or more of the PSS symbol, the first PBCH symbol, the SSS symbol, or the second PBCH symbol.

19. A non-transitory computer-readable medium having program code recorded thereon for operation on a user equipment (UE), the program code comprising:
  code for causing the UE to receive, from a wireless communication device, a synchronization signal block (SSB); and
  code for causing the UE to measure, based on timing offsets for each of a plurality of beams for receiving the SSB, one or multiple beams for receiving the SSB, wherein each of the plurality of beams are categorized into one or more groups based on the timing offsets for each of the plurality of beams for receiving the SSB.

20. The non-transitory computer-readable medium of claim 19, further comprising:
  code for causing the UE to determine, based on the timing offsets for each of the plurality of beams for receiving the SSB, a number of beams for receiving the SSB to measure.

21. The non-transitory computer-readable medium of claim 20, wherein the timing offsets are based on one or more measurements stored in a measurement database of the UE.

22. The non-transitory computer-readable medium of claim 20, wherein the code for causing the UE to determine the number of beams for receiving the SSB to measure further comprises:
  code for causing the UE to compare the timing offsets for each of the plurality of beams for receiving the SSB to at least one threshold.

23. The non-transitory computer-readable medium of claim 22, further comprising:
  code for causing the UE to categorize, based on the comparing the timing offsets to the at least one threshold, the plurality of beams for receiving the SSB into the one or more groups comprising at least a first group and a second group.

24. The non-transitory computer-readable medium of claim 23, wherein the code for causing the UE to determine the number of beams for receiving the SSB to measure is further based on the code for causing the UE to categorize the plurality of beams for receiving the SSB into at least the first group and the second group.

25. The non-transitory computer-readable medium of claim 20, wherein the code for causing the UE to determine the number of beams for receiving the SSB to measure comprises:
  code for causing the UE to determine, based on the timing offsets for each of the plurality of beams for receiving the SSB at a first time, a first number of beams for receiving the SSB to measure; and
  code for causing the UE to determine, based on the timing offsets for each of the plurality of beams for receiving the SSB at a second time, a second number of beams for receiving the SSB to measure, wherein the second number of beams is different than the first number of beams.

26. The non-transitory computer-readable medium of claim 19, wherein the code for causing the UE to measure one or multiple beams for receiving the SSB comprises:
  code for causing the UE to measure one, two, three, or four beams for receiving the SSB.

27. The non-transitory computer-readable medium of claim 26, wherein:
  the code for causing the UE to receive the SSB comprises code for causing the UE to receive a primary synchronization signal (PSS) symbol, a first physical broadcast channel (PBCH) symbol, a secondary synchronization signal (SSS) symbol, and a second PBCH symbol; and
  the code for causing the UE to measure one, two, three, or four beams for receiving the SSB comprises code for causing the UE to measure reference signal received power (RSRP) for one or more of the PSS symbol, the first PBCH symbol, the SSS symbol, or the second PBCH symbol.

28. A user equipment (UE), comprising:
  means for receiving, from a wireless communication device, a synchronization signal block (SSB); and
  means for measuring, based on timing offsets for each of a plurality of beams for receiving the SSB, one or multiple beams for receiving the SSB, wherein each of the plurality of beams are categorized into one or more groups based on the timing offsets for each of the plurality of beams for receiving the SSB.

29. The UE of claim 28, further comprising:
  means for determining, based on the timing offsets for each of the plurality of beams for receiving the SSB, a number of beams for receiving the SSB to measure.

30. The UE of claim 29, wherein the means for determining the number of beams for receiving the SSB to measure further comprises means for comparing the timing offsets for each of the plurality of beams for receiving the SSB to at least one threshold; and further comprising:

means for categorizing, based on the comparing the timing offsets to the at least one threshold, the plurality of beams for receiving the SSB into the one or more groups comprising at least a first group and a second group.

\* \* \* \* \*